UNITED STATES PATENT OFFICE.

EPHRAIM A. SNYDER, OF PHILADELPHIA, PENNSYLVANIA.

IMPROVEMENT IN EGG-PRESERVING COMPOUNDS.

Specification forming part of Letters Patent No. 169,595, dated November 2, 1875; application filed September 18, 1875.

*To all whom it may concern:*

Be it known that I, EPHRAIM A. SNYDER, of Philadelphia, in the county of Philadelphia and State of Pennsylvania, have invented certain new and useful Egg-Preserving Compound; and I do hereby declare the following to be a full, clear, and exact description of the invention, such as will enable others skilled in the art to which it pertains to make and use it.

My invention consists of a liquid compounded as follows: Sal-ammoniac, one ounce; gum-arabic, two ounces; sal-niter, one-fourth ounce; borax, one ounce. Dissolve in one quart of water—preferably hot water.

To carry my invention fully into effect this compound should be applied as follows: Use a large tub or barrel for mixing. To every thirteen (13) gallons of water use eight (8) quarts of fresh-slaked lime, eight (8) pints of fine salt, and one quart of the compound. Stir thoroughly several times, and let the liquor stand twenty-four (24) hours or longer, to settle. Then draw off the clear liquor as fast as needed. The more mixed at a time the better. Use no more lime and no more salt in preparing the liquor. Now cover the bottom of the cask or barrel in which the eggs are to be packed with one and one-half inch of slaked lime, spread down evenly, on which spread a clean muslin cloth. Now put into the barrel a few dozen eggs, and cover them with the liquor; and continue to put in eggs and liquor in this manner until the barrel is full to within four (4) inches of the top. Now pour on liquor until the barrel is full to the top. Watch the barrel, and always keep it full of liquor.

The lime used on the bottom of the barrel is to keep the liquor pure until the compound can act upon the shells of the eggs, said compound hermetically closing the pores of said shells in about thirty days.

If the liquor in a barrel of eggs becomes sour it must be drawn off, and fresh liquor put over the eggs; but this will not occur unless a mistake is made in mixing the liquor. Leave the eggs in the liquor until ready for shipment. Then take them out, rinse them off in clear water, dry them thoroughly, and they are then ready to be packed and shipped to any part of the country. Pack the eggs in cut rye or wheat straw, or perfectly dry and clean oats. The eggs, when placed in the liquor, should be fresh; and, to ascertain their condition, some suitable test should be applied.

I claim—

An egg-preserving composition composed of the following ingredients, to wit: Sal-ammoniac, gum-arabic, niter, borax, and water, substantially as described.

In testimony that I claim the foregoing I have hereunto set my hand this 13th day of September, 1875.

EPHRAIM A. SNYDER.

Witnesses:
M. DANL. CONNOLLY,
CHAS. F. VAN HORN.